Sept. 20, 1960  J. H. LAUB  2,953,022
THERMAL FLOW METER
Filed July 8, 1955

INVENTOR
JOHN HARRY LAUB
BY Milton E. Gilbert
ATTORNEY

United States Patent Office 2,953,022
Patented Sept. 20, 1960

2,953,022

THERMAL FLOW METER

John Harry Laub, 331 Forest Drive, Short Hills, N.J.

Filed July 8, 1955, Ser. No. 520,801

2 Claims. (Cl. 73—204)

This invention relates to a flow meter and is particularly concerned with a device for measuring the rate of flow or quantity of flow of a liquid or other medium flowing through a conduit.

This application is a continuation-in-part of my prior copending applications Serial #671,179, filed on May 21, 1946, and Serial #253,120, filed on October 25, 1951, both now abandoned.

The flow meter disclosed in my first aforementioned application is of the electrocaloric or thermal type and has the advantage of allowing free flow with low pressure drop of a flowing medium in a conduit, e.g. corrosive fluids, gasoline, ether, chlorine, etc. while enabling an accurate remote indication of the flow rate with no energy being taken from the fluid. It has the further advantage of requiring small space for its installation and since it is of small weight its use in airplanes has proved highly advantageous.

The aforementioned electrocaloric flow meter is subject to a certain time lag in connection with the transfer of heat from the heater coil to the flowing medium and thence to the indicating thermometer.

It is, therefore, one object of my invention to provide apparatus to automatically measure the flow of fluid in a conduit which is accurate over a very wide scale range corresponding to widely varying flow rates. It is a further object of my invention to eliminate the time lag inherent in a thermal flow meter.

Figure 1:
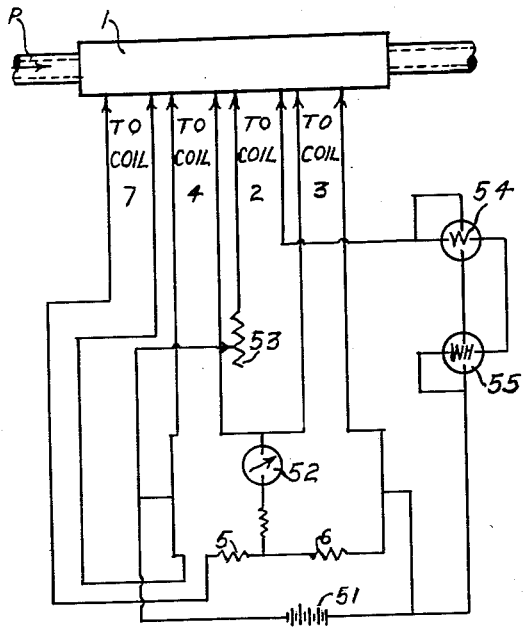
Figure 2:
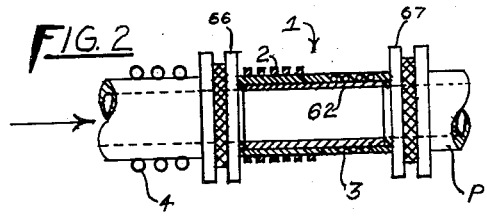
Figure 3:
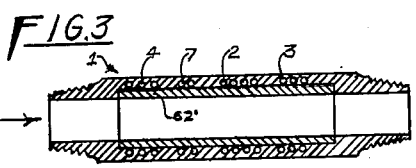
Figure 4:
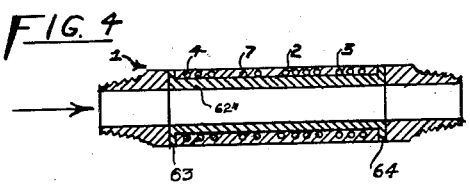
Figure 5:
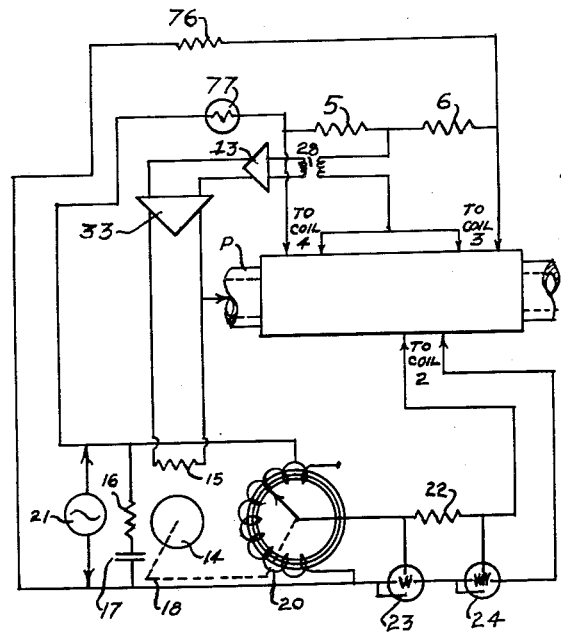
Figure 6:
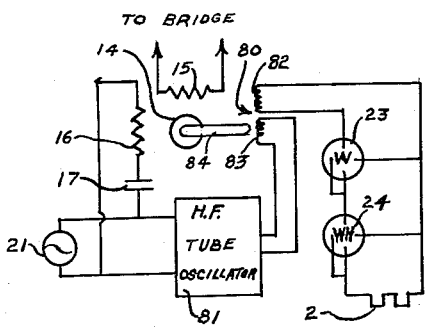

The nature of the electrical arrangement of this invention and the functioning thereof will become more apparent as will other objects and advantages thereof from the following description and the accompanying drawings, in which:

Fig. 1 represents a partial schematic illustration of the thermal flow meter of the invention showing details of the electrical circuit, Fig. 2 represents a partial cross-sectional view of the coil mountings of the thermal flow meter of the invention, Fig. 3 represents a cross sectional view showing a modification of the coil mountings of the thermal flow meter of the invention, Fig. 4 represents a cross sectional view of a further modification of the coil mountings of the thermal flow meter of the invention, Fig. 5 represents an alternate electrical circuit arrangement of the flow meter of the invention, and Fig. 6 represents a modification of a portion of the circuits shown in Fig 5.

If heat energy is introduced into or withdrawn from a medium flowing within a conduit and its temperature is measured both before and after the heat exchange, the temperature difference $\Delta t$ between that before the heat exchange and that after the heat exchange will vary with the rate of flow. The differential temperature $\Delta t$ will be small for high flow rates and large for low flow rates.

The flow meter of my invention is shown in Figure 1 wherein a conduit or pipe P is shown as the means through which the medium flows. This pipe line P contains a section 1 within which the coils of the instrument are mounted. The heating means 2 and the two resistance thermometer coils 3, 4 may be mounted on the pipe P directly where small diameter conduits are involved. However, if large quantities of fluid are to be measured it may be desirable to employ a shunt arrangement wherein a by-pass conduit is used to tap the main conduit section. Heat is transferred to the flowing medium through a coil 2 located on the pipe P in a manner as more fully described hereinafter. The resistance thermometers 3, 4 consist of coils of thermo-responsive wire or ribbon, e.g. nickel, platinum, alloys of precious metals, etc. The reference thermometer 4 is located on the conduit preceding the heater coil in the flow stream to measure the temperature of the fluid prior to the application of heat to the fluid. A resistance thermometer 3 is located adjacent the heater means in a manner as more clearly explained in connection with Figures 2–4.

If the wattage input W to the coil 2 is kept constant and the temperature differential $\Delta t$ is measured, the rate of flow M would be approximately inversely proportional to $\Delta t$ and would have to be read on a meter with a nonuniform, i.e. hyperbolic scale. If, however, the temperature difference $\Delta t$ is kept constant by varying the wattage input to the heater coil, the rate of flow is practically proportional to the wattage input and can be read on the linear scale of a wattmeter 54 measuring said input.

The latter arrangement is preferred although either method may be used in practicing my invention and is accomplished by connecting the resistance thermometers 3, 4 to a Wheatstone bridge circuit as two arms thereof and two fixed resistances 5, 6 are provided as the ratio arms thereof. A rheostat 53 is provided in series with the coil 2 and the power supply 51. The bridge circuit is kept in balance for a given temperature difference. If the balance is disturbed by a change in the rate of flow, it is restored by increasing or decreasing the wattage input ot the coil 2.

Totalizing of the flow can be achieved simply by adding to the coil circuit a watthour meter 55 which will then register the total quantity of the fluid passing through section 1. Both the watt meter and watthour meter are calibrated to read flow values directly.

The accuracy of flow measurements with the electrocaloric meter may be affected by changing temperature of the fluid. As indicated by general heat transfer considerations the wattage input to the heater means and the flow rate are practically directly proportional as long as the specific heat of the fluid remains constant. The latter is practically constant within a wide range of temperatures for most gases but varies somewhat for most liquids. For aviation gasoline of 0.702 specific gravity for instance, the specific heat is 0.49 at 0° C. and increases proportionately with temperature to 0.55 at 50° C., i.e. at the rate of approximately ½ of 1% per ° C.

Furthermore, the viscosity of the fluid is also affected by its temperature. It increases for gases and decreases for liquids with increased temperature, and thus affects, to a certain extent, the character of the flow and the mechanism of the heat transfer between the coils and the fluid. Without going into the details of the rather involved theory of fluid flow and heat transfer in pipes, it is only necessary to consider the fact that the local velocity of the fluid within a conduit is not uniform. The velocity distribution is governed by the Reynolds number which is inversely proportional to viscosity and therefore a function of fluid temperature. For Reynolds numbers below approximately 2100, the motion of the fluid becomes streamline and the local velocity rises from zero at the wall to a maximum at the center along a parabolic distribution curve. For Reynolds numbers greater than approximately 2100, the flow is turbulent and the velocity distribution curve rises more sharply from zero at the wall to a maximum at the center.

It is obvious, therefore, that the heat transfer from the wall to the fluid is affected by the character of the flow in the neighborhood of the wall, i.e. by the flow characteristics of the boundary layer of the fluid, and hence by the temperature of the fluid. As a result of this, the flow meter will tend to show a temperature error which may be considerable when the fluid temperature is greatly varied.

This error may be eliminated by placing a small coil 7 of a wire with a high temperature coefficient of electrical resistance (the resistance of which changes with temperature), i.e. nickel, around the main conduit section 1 and connecting it to one of the ratio arms of the bridge (i.e. arm 5). Thus the ratio arm 5, the resistance of which normally would not vary with temperature is made slightly sensitive to temperature and the Wheatstone bridge is automatically kept in balance for all temperatures within a given range, indicating unbalance only as a result of a change in the rate of flow of the flowing medium. This method of temperature compensation is so effective that in the previously cited instance of aviation gasoline, the temperature error can be held under $\pm\frac{1}{2}$ of 1% within a temperature range of from 0° C. to 50° C.

The coil 7 may alternately be connected in parallel to shunt the bridge or may be connected in the line between the bridge and the power supply. Furthermore, since the coil consists of wire the resistance of which does not vary with temperature, the coil 7 may shunt the coil 2 alone, so that as the temperature of the flowing medium rises in the conduit the shunt resistance will increase and a larger share of the wattage will go into the heater coil to rebalance the bridge. The coil, 7, may also be used in any of the other embodiments of the invention.

It has been found that in using a flowmeter as constructed in accordance with the prior suggestions, an objectionable time lag may be present, especially in measuring large flow rates requiring large wattage consumption. This thermal lag is eliminated or at least very substantially reduced by so constructing the transmitter tube section 1 of the conduit P to insure a rapid transfer of heat from the heater coil 2 to the flowing medium and thence to the indicating thermometer 3, adjacent thereto. This may be also accomplished by applying the method of induction heating to the flowing medium, and is particularly applicable if a high frequency A.C. is available as the source of electrical energy.

As generally indicated in Figure 1 and in more detail in Figure 2, the reference resistance thermometer 4 which measures the temperature of the fluid before heat is transferred to it is mounted prior to the coils 2 and 3, and is wound around the transmitter section, whereas the indicating resistance thermometer 3, which measures the temperature of the fluid after heat is transmitted thereto, is embedded into the section 1. This section 1 is made of an electrically insulating material, as for example, silica, lava, steatite, stoneware, or some plastic material such as Bakelite, Lucite, etc. The coil 3 may be imbedded by a molding operation.

Fitted within the tube 1 is a metal tube 62 through which the fluid flows. This tube 62 may be of any material which is a good heat conductor and may also be of a material which is resistant to the action of corrosive fluids. The thermometer 3 is thus wound around and in close thermal contact with tube 62. In view of the heat insulating characteristics of the tube 1, the end flanges 66, 67 of the tube can be connected directly with the flanges of the adjacent sections of conduit P.

Thus, when the coil 2 is energized with alternating current of sufficiently high frequency the metal tube 62 is inductively heated by eddy currents produced by the electromagnetic field of coil 2 and the heat is transferred rapidly and immediately to the medium within the transmitter tube.

The desirability of using a high frequency A.C. is readily apparent when it is considered that the E.M.F. induced in tube 62 is directly proportional to the rate of change in the magnetic flux linked with it. Consequently where a high frequency A.C. is used the flux through tube 62 changes at a high rate of lines per second and the eddy current set up will have a high value.

The heat generated by the eddy currents in tube 62 is rapidly transferred to the resistance thermometer 3 which is wound thereon and in intimate contact therewith and also to the fluid. There is thus practically eliminated any time delay between an energy flow into the induction heater coil 2, a creation of eddy currents and heat in the metal tube section 62 and a sensing of this heat input by the element 3.

Even more compact and simpler arrangements are shown in Figures 3 and 4, which remove to an even greater extent remaining time lags. In Figure 3, the section 1 is of a plastics material and is threaded or otherwise formed (or suitably formed metal fittings are molded into it) at each end for assembly into a conduit. A thin metal tube or sleeve section 62' is molded into the section 1 (shown in the drawing somewhat thicker than it would actually be with respect to section 1). All the coils 3, 7, 2 and 4 are molded into the section 1 closely adjacent the metallic tube 62', but out of electrical contact therewith due to the insulation surrounding each coil, which may be the plastics material of the section 1. The thin sleeve protects the coils from exposure to corrosive fluids and also from the effects of fluids under high pressure. In this manner, even time lags due to heat transfer problems adjacent the thermometer coil 3 when the temperature of the flowing medium varies due to causes other than heat input of the heating means 2, 62', may be eliminated. Because of the proximity of all the coils to the metallic tube 62' it is not necessary to use an induction heating method, and hence the coil 2 in Figure 3, and also in Figure 4, may be a resistance wire heater coil and the elimination of time lag during the heat transfer is effected due to close location of these elements to the fluid medium. As indicated in Figure 4, a metallic sleeve or tube 62" may have its ends turned up or flanged as at 63, 64, so that the edges of these flanges form part of the surface of the section 1. This is desirable where corrosive fluids are used, since the possibility exists that some leakage or seepage of flowing medium around the edges of a straight metallic sleeve (62 in Figs. 2 or 3) may occur.

The circuit for energizing coil 2 of Figures 2–4 may be that of Figure 1, however, a more convenient and practical arrangement is that shown in Figure 5. Here again the two resistance thermometers 3 and 4 form two arms of a Wheatstone bridge and two thermo-constant resistors 5 and 6 form the remaining arms, all as previously described in connection with Figure 1.

The Wheatstone bridge is connected through a series resistance 76 of thermoconstant material to A.C. power source 21. The resistor can be used for adjustment and compensating purposes, or it can be omitted if desired. If the voltage of the power supply varies, which is not uncommon when tapping into power mains, there would be excessive fluctuations in the electrical circuit and therefore a ballast tube 77 or a constant voltage stabilizing transformer is advantageously inserted between the power supply and the Wheatstone bridge.

On the output diagonal of the bridge is placed the primary of a transformer 28, the output of which supplies, in series, a voltage amplifier 13 and a power amplifier 33. Such a voltage amplifier 13 may consist for example of a number of resistance coupled triodes connected in series or of several amplifier stages used in cascade, the output of one stage being fed to the grid circuit of the next, to provide amplification on the relatively weak signal from the bridge to a voltage sufficiently high to drive the grids of power amplifier 33 which forms the second stage of the electronic amplifier. Any conventional type of electronic power amplifier can be used, a satisfactory example comprising triodes operating in parallel and providing an output current sufficiently large to energize one coil 15 of a two-phase reversible induction motor, 14. The second phase 16 of the motor 14, shown in Figure 5, is connected to the A.C. power source by means of a capacitor 17 in order to be displaced approximately 90° C. from the current in the first phase. As is well known, this arrangement of motor 14 has phase discriminating characteristics and the motor will reverse its direction of rotation when the signal from the bridge goes through zero and reverse its phase.

The induction heater coil 2 is provided with a variable voltage supply and a fixed resistor 22 connected in series therewith. The variable voltage supply may be produced by a voltage regulator 20, which may be of the well known "Variac" or "Transtat" variable voltage transformers. These consist of a toroid shaped transformer having a plurality of taps which are connected to segments on a commutator and over which a brush or movable contact slides and from which the variable voltage for the heater coil 2 is taken. The voltage regulator is energized from a high frequency A.C. source 21. The use of higher frequencies also permits of smaller dimensions and smaller weight for the voltage regulator 20.

As shown in Figure 5, the motor 14 is mechanically coupled by a means 18 to the voltage regulator 20 to control the wattage input to the coil 2. If the flow rate varies, the Wheatstone bridge of the flow meter will become unbalanced and a signal produced which is amplified as hereinabove described, and then applied to rotate the motor in one direction or the other. Since the movable contact element of the regulator 20 is mechanically connected to the motor 14, the wattage input of the coil is varied proportionately as the flow rate varies. Thus, the temperature drop between the thermometers 3, 4 is maintained constant while the wattage input to the heater is varied and the balance of the bridge is maintained. As indicated previously the rate of flow is proportional to W and can be read directly on a properly calibrated linear scale of a wattmeter 23 measuring W, placed in the coil circuit of coil 2. Totalizing of the flow can be achieved as in Figure 1 by adding watt hour meter 24 to the induction coil circuit.

Where a high frequency is used in supplying energy to the coil 2 (Fig. 5) a simpler means may be used to vary the wattage input to the coil than the regulator 20. In addition, any time lag appearing in the operation of a voltage regulator which is mechanically driven, is eliminated by the arrangement shown in Figure 6. The coil 2 receives its power from the high frequency A.C. source 21 through an electron tube oscillator 81. The motor 14 is mechanically coupled to a tuning circuit 80 to control the frequency of oscillation and hence the amount of the continuous alternating current generated by the tube. For example, the well known "tickler circuit" or a Hartley circuit can be used with a magnetic feedback, which is adjusted by adjusting the magnetic coupling between coils 82 and 83. The motor rotates a tuning rod 84 to accomplish this adjustment. Thus, if the flow rate varies from the desired value, the signal produced in the Wheatstone bridge is applied to rotate motor 14 in one direction or the other. Since the tuning rod 84 is mechanically connected to the motor 14 the wattage input to the heater coil is varied proportionately as the flow rate varies.

As indicated above, I have provided a highly efficient flow meter for measuring flow rates of a flowing medium in a confined conduit with very low thermal time lag. The flow rate can be measured by two methods. Firstly, the wattage input to the heater coil may be kept constant and the temperature difference between the two thermometers is used to indicate flow; or secondly, the wattage input to the heating means may be varied to keep the temperature differential between the two thermometers constant and then the rate of flow is measured by measuring wattage input. The problem of thermal time lag is present in practicing both methods, although it is perhaps more pronounced in the case of varying the heat input. Where the heat input to the fluid is varied, there would be objectionable time lag in the sensing of the temperature of the fluid after the heat is transmitted to it, and this objectionable time lag is present also when the flow is indicated by the change in temperature differential between the two thermometers, and a rebalancing system is not used. The latter is readily apparent when it is considered that it is primarily the change in fluid flow which determines the temperature sensed by the second temperature sensing means of the invention, i.e. the extent to which the fluid is heated by the metallic tube or the resistance heater coil of the invention. Thus, the structure of the invention serves also to eliminate the time lag between the change in temperature of the metallic tube brought about by a change in the flow rate and a resultant greater or lesser dissipation of heat into the fluid from the tube.

Although I have described above certain specific illustrations of my invention it should be understood that many changes may be made that do not depart from the spirit or scope of the invention.

What I claim is:

1. Flow metering apparatus for measuring the flow of a confined flowing medium by measuring the temperature of the boundary layer thereof comprising flow conduit means; heating means for heating substantially only the boundary layer of the flowing medium; said flowing fluid exerting pressure on the walls of said conduit; flow sensing means including a first and a second temperature responsive electrical resistance means, said first temperature responsive means being located on said conduit to be responsive to the flowing medium boundary layer temperature prior to the transmission of heat thereto, said second temperature responsive means being located closely adjacent the area of heat transmission and responsive to the flowing medium boundary layer temperature after the transmission of heat thereto; a bridge network including the temperature responsive resistances as arms thereof, unbalance detector means connected across the diagonal of the bridge and responsive to departures of the flow from a predetermined flow rate; said conduit means including a transmitter portion containing an insert assembly, the insert assembly comprising the heating means and said second temperature responsive means, the heating means including a coil and a discrete thermally conductive thin walled insert element in direct thermal contact on its inner surface with the boundary layer of the flowing medium; said coil and said second temperature responsive means being in intimate thermal contact with the outer surface of said element, the thickness of said insert element being a minimum for transmission of heat necessary to heat substantially only the boundary layer of said flowing medium thereby reducing the thermal resistance between said coil and boundary layer, said insert being of insufficient thickness and mechanical strength to withstand the said fluid pressure; and a second element, of thermal insulation material, in contact with the outer surface of said first element sealing it, said coil and said second temperature responsive means from ambient conditions, said second element additionally providing mechanical support for the insert element to withstand said fluid pressure.

2. Flow metering apparatus for measuring the flow of a confined flowing medium by measuring the temperature of the boundary layer thereof comprising flow conduit means; heating means for heating substantially only the boundary layer of the flowing medium; said flowing fluid exerting pressure on the walls of said conduit; flow sensing means including a first and a second temperature responsive electrical resistance means, said first temperature responsive means being located on said conduit to be responsive to the flowing medium boundary layer temperature prior to the transmission of heat thereto, said second temperature responsive means being located closely adjacent the area of heat transmission and responsive to the flowing medium boundary layer temperature after the transmission of heat thereto; a bridge network including the temperature responsive resistances as arms thereof, unbalance detector means connected across the diagonal of the bridge and responsive to departures of the flow from a predetermined flow rate; said conduit means including a transmitter portion containing an insert assembly, the insert assembly comprising the heating means and said second temperature responsive means, the heating means including a resistance wire mounted around a thin walled discrete thermally conductive tube in direct thermal contact on its inner surface with the boundary layer of the flowing medium; said wire and said second temperature responsive means being in intimate thermal contact with the outer surface of said element, the thickness of the tube being a minimum for transmission of heat necessary to heat substantially only the boundary layer of said flowing medium thereby reducing the thermal resistance between said wire and boundary layer, said tube being of insufficient thickness and mechanical strength to withstand the said fluid pressure; and an outer element of thermal insulation material formed around the second temperature responsive means, resistance wire and around the thin walled tube isolating it from the remainder of said flow conduit, whereby said wire and second temperature responsive means are sealed from ambient conditions and said outer element provides mechanical support for the inner tube to withstand said fluid pressure.

References Cited in the file of this patent

UNITED STATES PATENTS

| | | |
|---|---|---|
| 1,691,600 | Brush et al. | Nov. 13, 1928 |
| 2,176,502 | Kurth et al. | Oct. 17, 1939 |
| 2,349,673 | Pearson et al. | May 23, 1944 |
| 2,729,976 | Laub | Jan. 10, 1956 |

FOREIGN PATENTS

| | | |
|---|---|---|
| 601,298 | Great Britain | May 3, 1948 |
| 651,152 | Great Britain | Mar. 14, 1951 |